B. E. CARRM.
CONVERTIBLE VEHICLE BODY.
APPLICATION FILED FEB. 18, 1918.
1,413,965.
Patented Apr. 25, 1922.
4 SHEETS—SHEET 1.
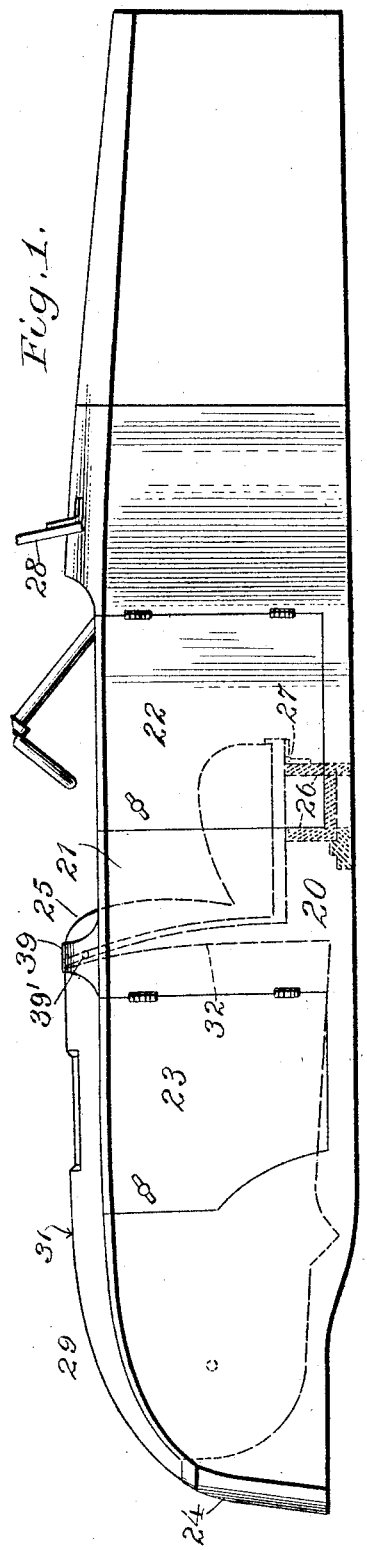
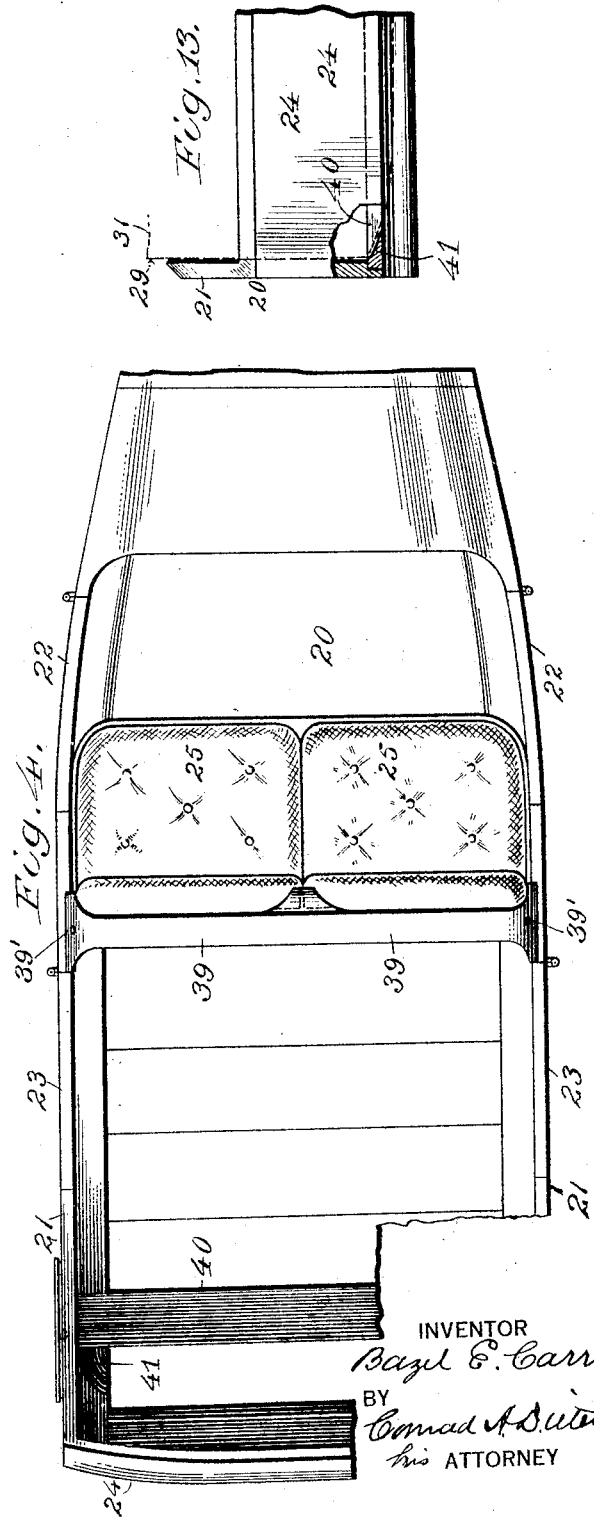
INVENTOR
Bazil E. Carrm
BY
Conrad A. Dieterich
his ATTORNEY

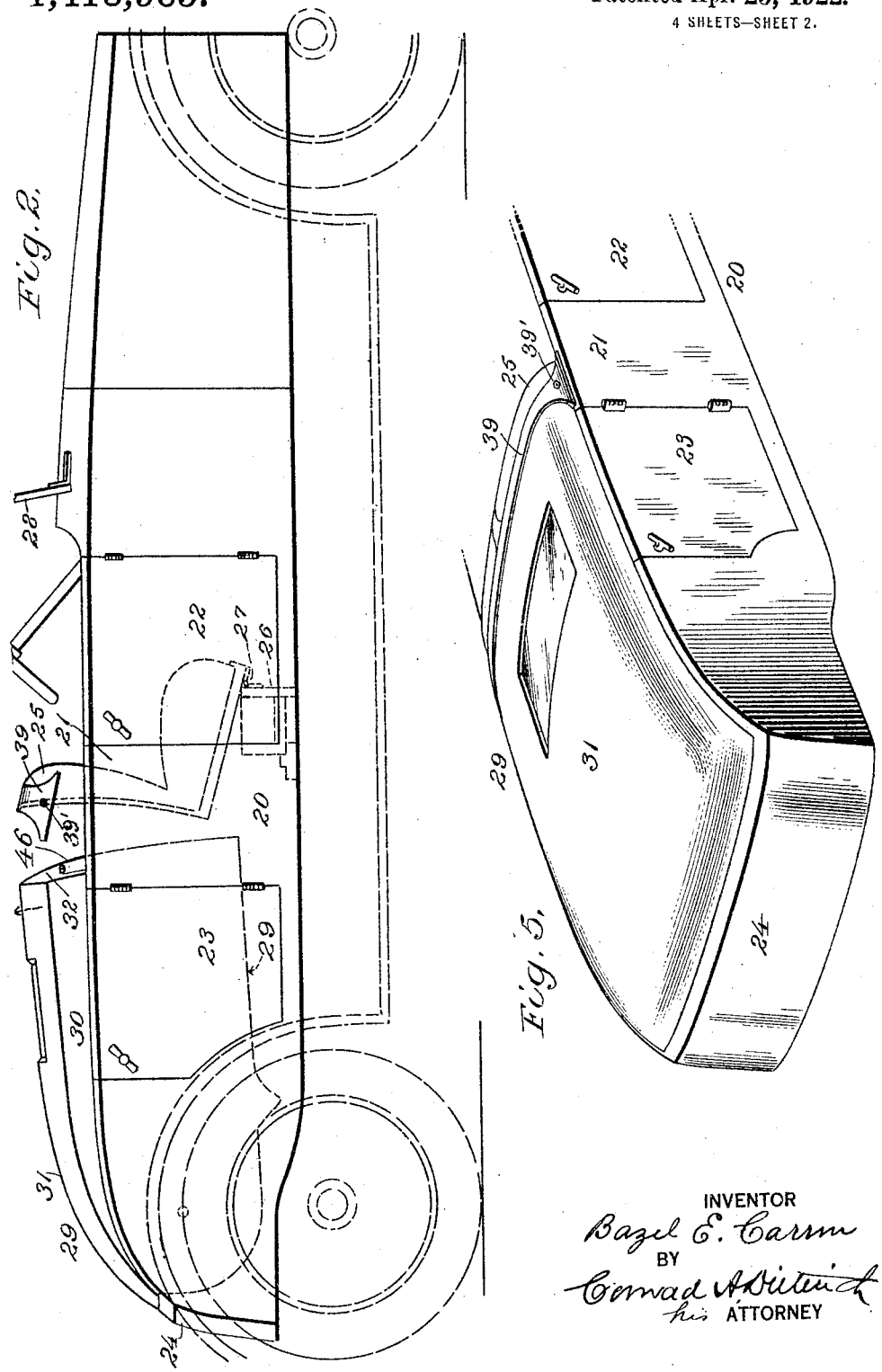

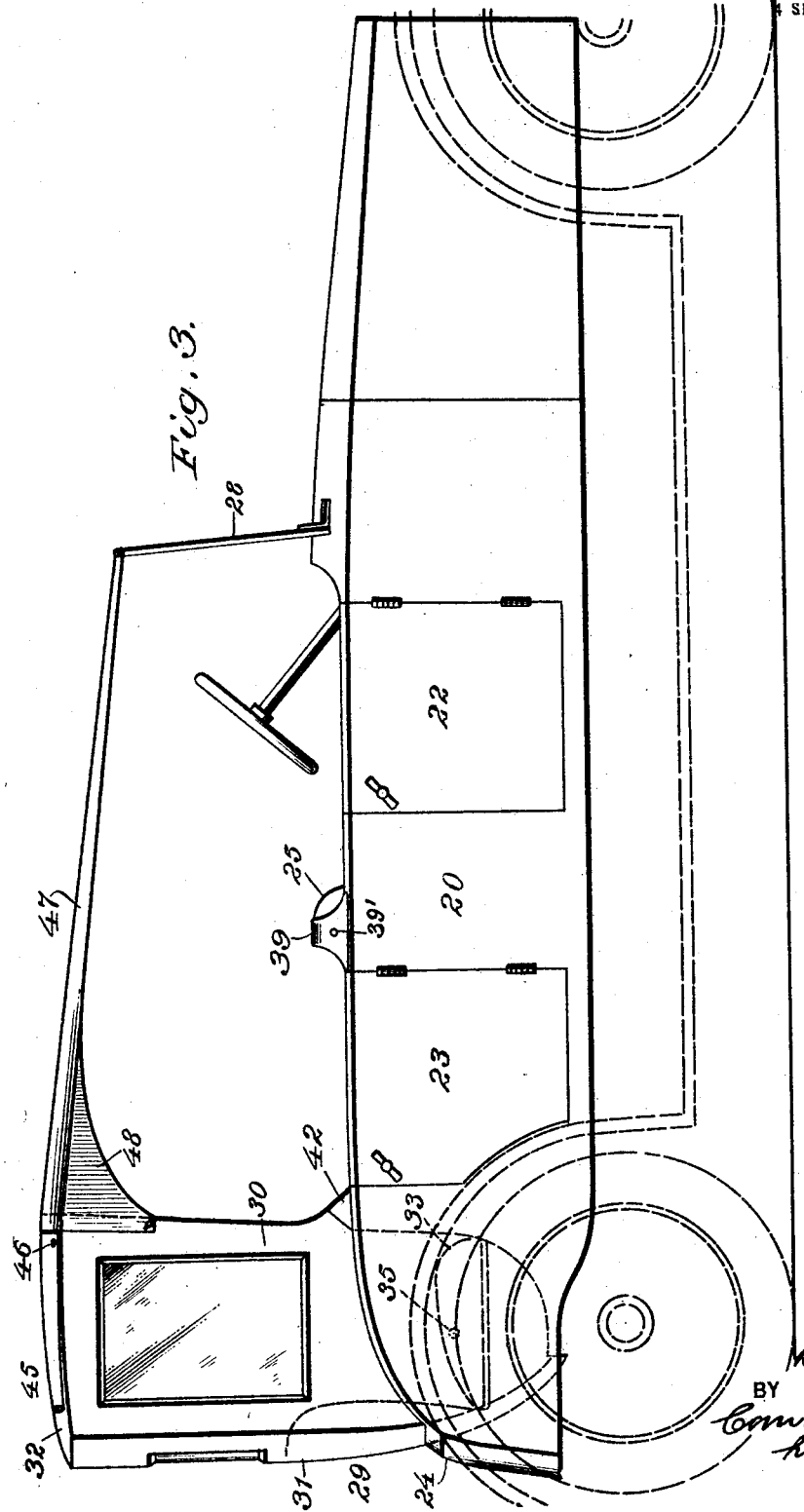
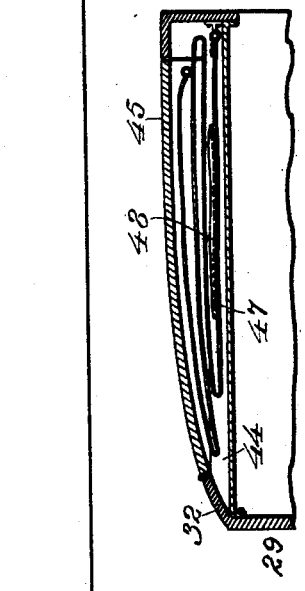

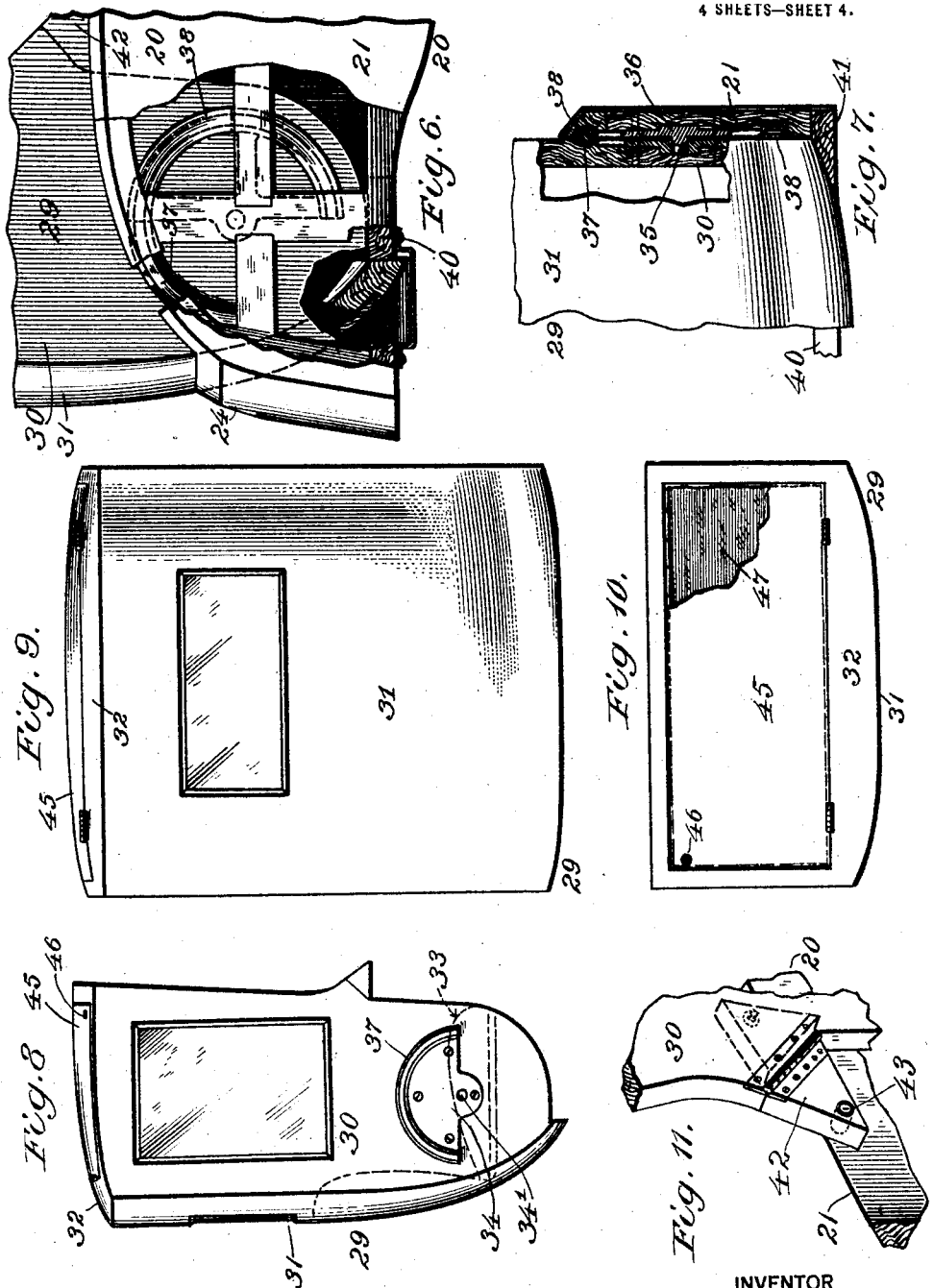

UNITED STATES PATENT OFFICE.

BAZEL E. CARRM, OF NEW YORK, N. Y.

CONVERTIBLE VEHICLE BODY.

1,413,965.   Specification of Letters Patent.   Patented Apr. 25, 1922.

Application filed February 18, 1918. Serial No. 217,830.

*To all whom it may concern:*

Be it known that I, BAZEL E. CARRM, residing at the city of New York, borough of Manhattan, in the county and State of New York, have invented certain new and useful Improvements in Convertible Vehicle Bodies, of which the following is a full, clear, and exact specification.

This invention relates to improvements in convertible vehicle bodies and the same is more particularly applicable for use in connection with automobiles employed for the accommodation of passengers.

One of the objects of the invention is to provide a body which may quickly and readily be converted into any one of a plurality of types or styles.

Further, said invention has for its object to provide a body adjustable at will to permit the vehicle to be used as a runabout or as a partially enclosed vehicle adapted to accommodate five or more passengers.

Further, said invention has for its object to provide a body comprising a fixed main section and a section movably supported thereon and adapted to occupy a plurality of positions.

Further, said invention has for its object to provide a body comprising a fixed main section having a front compartment, and a section movably supported upon the main section adjacent the rear thereof and adapted to be adjusted to form a rear compartment, or to form a deck for the portion of the main section in rear of the front compartment.

Further, said invention has for its object to provide a body comprising an enclosure having a receptacle formed in the roof thereof adapted to receive parts or accessories.

Further, said invention has for its object to provide a body comprising an enclosure having a receptacle formed in the roof thereof serving as a container for a curtain which may be withdrawn from the receptacle and positioned upon the body to form a top therefor.

Other objects will in part be obvious and in part be pointed out hereinafter.

To the attainment of the aforesaid objects and ends my invention consists in the novel details of construction, and in the combination, connection and arrangement of parts hereinafter more fully described and then pointed out in the claims.

In the accompanying drawings showing an illustrative embodiment of the invention, Figure 1 is a view in side elevation of an automobile body constructed according to and embodying the invention, the body being shown adjusted for use as a runabout;

Fig. 2 is a similar view showing the position of the parts in the course of adjustment for use as a five or seven passenger body of the partially enclosed type;

Fig. 3 is a similar view showing the body adjusted for use as a five or seven passenger body of the partially enclosed type;

Fig. 4 is a plan, partly broken away, of the fixed main section of the body;

Fig. 5 is a detail perspective view showing the movable section in its lowered or deck forming position;

Fig. 6 is a detail view, partly broken away, showing the manner of mounting the movable section upon the fixed main section;

Fig. 7 is a detail view, partly broken away, showing the connecting means between the sections, the view being taken at right angles to the view shown in Fig. 6;

Fig. 8 is a view in side elevation of the movable section;

Fig. 9 is a rear view thereof;

Fig. 10 is a plan thereof;

Fig. 11 is a detail view showing parts of the movable and fixed sections, and the means for locking the movable section in its raised position;

Fig. 12 is a detail sectional view of the upper portion of the movable section, and Fig. 13 is a detail rear end view partly broken away.

Referring to the drawings, the automobile body, which may be mounted upon a chassis of any approved construction, comprises a fixed main section 20 having side walls 21 extending throughout the length thereof, to which are hinged front doors 22, and rear doors 23, affording access to the front and rear compartments of the body. At their rear ends the side walls 21 are connected by a transverse member 24 serving as a brace, and as the rear wall of the body.

Positioned within the front compartment is a seat 25 of any suitable construction, resting upon a support 26, to which it is secured by a hinge 27, so arranged as to permit the seat 25 to be tilted forwardly, as shown in Fig. 2, for a purpose hereinafter set forth. A wind shield 28, of any approved type, is mounted upon the cowl of the main section 20.

Mounted upon the fixed main section 20, adjacent the rear thereof, is a movable section 29, comprising side walls 30, a rear wall 31, and a roof 32, and provided with a seat 33 enclosed by the side and rear walls thereof, as indicated in Fig. 8. The outer surfaces of the side walls 30 of the movable section 29 are flush with the inner surfaces of the side walls 21 of the fixed main section 20, and, adjacent their lower ends, said side side walls 30 are provided with plates 34 having sockets 34' formed therein, into which extend pivots 35 projecting from plates 36 carried by the side walls 21 of the main section 20. The plates 34 are further provided with arc-shaped guide members 37 slidingly engaging arc-shaped guideways 38 secured in recesses formed in the inner side of the side walls 21. This construction permits of the movable section 29 being rotated upon the supporting pivots 35 with respect to the fixed main section 20 to occupy a lowered or a raised position with respect thereto, as shown in Figs. 1 and 3 respectively.

When the movable section 29 is in its lowered position, as shown in Fig. 1, it is received within the portion of the main section 20 in rear of the front compartment, and the parts are so proportioned that the rear wall 31 of the movable section 29 will form a deck or covering for such portion of the main section 20. When the parts are so adjusted the automobile is adapted for use as a runabout and the body presents the appearance and form of the so-called "turtle-back" type of body.

In order to form a weather-proof joint between the front seat 25 and the movable section 29 when in its lowered position, a strip 39 is secured to the back of the seat 25 and extends rearwardly therefrom so to be in overlapping engagement with the upper end of the rear wall 31. The ends of the strip 39 are preferably flared and rest upon the side walls 21 of the main section 20 and secured thereto by locks 39', in order to form a more perfect protection against the entrance of water between the parts. When the movable section 29 is to be moved into or out of its lowered position it is necessary to tilt the seat 25 forwardly upon its hinge, as indicated in Fig. 2, in order that the strip 39 will be carried out of the path of movement of the movable section 29.

If it is desired to convert the body from the runabout type to the five or seven passenger partially enclosed type, it is merely necessary to tilt the front seat 25 forwardly to carry the strip 39 out of its overlapping relation with the upper end of the movable section 29, and then raise the latter to its upright position. The upward movement of the movable section 29 is limited by the lower end of the back wall 31 thereof coming into engagement with the transverse floor member 40 of the main section 20, as shown in Fig. 6. The side members of the frame are recessed, as indicated at 41, Figs. 4 and 13, to receive the lower edge of the rear wall 31 of the movable section 29.

In order to lock the movable section 29 securely in its raised position the side walls 30 are provided with hinged portions 42 adapted to be extended to engage the side walls 21 of the main section 20 and carrying bolts 43, of any suitable type, adapted to extend within suitable sockets formed in the side walls 21, see Fig. 11. When the movable section 29 is lowered into the position which it occupies when the automobile is used as a runabout, the hinged portions 42 are folded against the side walls 31, as indicated in dotted lines in Fig. 6, in order that the movable section 29 will be properly positioned within the main section 20.

As shown in Fig. 12 the roof 32 of the movable section 29 has a receptacle 44 formed therein provided with a hinged cover 45 constituting a portion of the upper surface of the roof 32, and having its free end spaced from the fixed portion of the roof a distance sufficient to permit of the cover 45 being closed when the curtain, hereinafter described, is in its extended position. Suitable locks 46 are provided for holding the cover 45 in its closed position. Positioned within the receptacle 44 is a curtain 47, of canvas or the like, one end of which is secured to the roof 32. The curtain 47 is preferably folded, when within the receptacle 44, as shown in Fig. 12. If it is desired to use the curtain 47 as a top for the body, the cover 45 is raised and the curtain 47 is then withdrawn and extended in a forwardly direction, its free end being secured to the wind shield 28 in any suitable manner, as shown in Fig. 3. In order to present a neat appearance the curtain 47 is preferably provided with downwardly-extending portions 48 adjacent its rear end adapted to be secured to side walls 30 of the movable section 29.

To convert the body from the five or seven passenger, partially enclosed type, as shown in Fig. 3, to the runabout, as shown in Fig. 1, it is merely necessary first to withdraw the bolts 43 from their locking engagement with the side walls 21, then to fold the portions 42 against the side walls 30, as indicated in Fig. 11, and then lower the movable section 29 within the main section 20, the seat 25 being tilted forwardly to carry the strip 39 out of the path of movement of the section 29. When the movable section 29 is in the lowered position the seat 25 is then permitted to assume its normal position, resting upon the support 26, with the strip 39 over-lapping and forming a weather-proof joint with the upper end of the movable section 29. It is of course understood that if the curtain 47 has been in use, it is folded within the receptacle 44 in the roof 32 of the movable section 29 before the latter is moved to occupy its lowered position.

Having thus described my said invention what I claim and desire to secure by Letters Patent, is:—

1. A convertible vehicle body comprising a main body portion, a seat dividing said main body portion into a front compartment and a back compartment, and an adjustable section movably supported upon said main body portion and adapted, in one position, to lie completely within the part of said main body portion to the rear of said seat, and, in another position, to form a covered passenger compartment arranged at right angles to the longitudinal axis of said main body portion, substantially as specified.

2. A convertible vehicle body comprising a main body portion, a seat dividing said main body portion into a front compartment and a back compartment, and a section pivotally supported upon said main body portion adapted to be received completely within the part of said main body portion to the rear of said seat and lie in a position parallel with the longitudinal axis of said main body portion, and in another position to form a covered passenger compartment extending vertically out of said main body portion, substantially as specified.

3. A convertible vehicle body comprising a main body portion, a seat dividing said main body portion transversely to form a front compartment and a back compartment, and a section pivotally supported upon and adapted to be received within said main body portion to the rear of said seat, and in one position, to form a covered deck therefor, and, in another position, to form a covered passenger compartment supported at right angles to the longitudinal axis of said main body portion and project upwardly out of said main body portion, substantially as specified.

4. A convertible vehicle body comprising a main body portion, a seat dividing said main body portion transversely to form a front compartment and a back compartment, a section pivotally supported upon and adapted to be received within said main body portion to the rear of said seat, in one position, and to form a covered deck therefor, and in another position to form a covered passenger compartment supported at right angles to the longitudinal axis of said main body portion and project upwardly out of said main body portion, and means for securing said pivotally supported section to its adjusted positions, substantially as specified.

5. A convertible vehicle body comprising a fixed main body portion, a seat dividing said main body portion into a front compartment and a back compartment, a section movably supported upon said main body portion and adapted to occupy a plurality of positions; said movable section, in one of its positions, serving as a closure for said rear compartment, and in another position to form a covered passenger compartment arranged partly within and partly without said main body portion, substantially as specified.

6. A convertible vehicle body comprising a fixed main body portion, a seat dividing said main body portion into a front compartment and a back compartment, a section movably supported upon said main body portion and adapted to occupy a plurality of positions; said movable section, in one of its positions, serving as a closure for said rear compartment, and in another position to form a covered passenger compartment arranged partly within and partly without said main body portion, and means for securing said movable section to its last named adjusted position, substantially as specified.

7. A convertible vehicle body comprising a fixed main section having a front compartment, a seat within said front compartment, a section movably supported upon said main section and adapted to occupy a plurality of positions, said movable section serving in one of its positions to form a rear compartment and serving in another of its positions to form a deck for the portion of said main section in rear of said seat, and means carried by said seat for forming a weather-proof joint between said seat and said movable section when the latter is in its deck-forming position, said seat being movable whereby said means may be withdrawn to permit said movable section to be moved from one of its positions to another thereof, substantially as specified.

8. A convertible vehicle body comprising a fixed main section having a front compartment, a seat within said front compartment, a section movably supported upon said main section and adapted to occupy a plurality of positions, said movable section serving in one of its positions to form a rear compartment and serving in another of its positions to form a deck for the portion of said main section in rear of said seat, and means carried by said seat and adapted to overlap said movable section when the latter is in its deck-forming position to form a weather-proof joint, said seat being movable whereby said means may be withdrawn to permit said movable section to be moved from one of its positions to another thereof, substantially as specified.

9. A convertible vehicle body comprising a main body portion, means dividing the same transversely to form a front compartment and a back compartment, a section pivotally supported adjacent to one end with said main body portion and adapted to occupy a plurality of positions with respect thereto: said movable section, in one of its positions, serving as a closure or deck for said rear compartment, and in another position to form a covered passenger compartment comprising a back, top and sides, arranged partly within and partly without the back compartment of said main body portion, substantially as specified.

10. A convertible vehicle body comprising a fixed main body portion, a seat dividing said main body portion transversely into a front compartment and a back compartment and a section pivotally supported adjacent to one end within said main body portion and adapted to occupy a plurality of positions with respect thereto: said movable section in one of its portions serving as a closure for said rear compartment, and in another position to form a covered passenger compartment consisting of a back, top and sides, arranged partly within and partly without said main body portion, substantially as specified.

11. A convertible vehicle body comprising a fixed main body portion, a seat dividing said main body portion transversely into a front compartment and a back compartment, a section pivotally supported adjacent to one end with said main body portion and adapted to occupy a plurality of positions with respect thereto, a seat in said movable section adjacent to its pivoted end; said movable section, in one of its positions, serving as a closure for said rear compartment, and in another position to form a covered passenger compartment having its seat portion arranged within said main body portion, and the top extending from said seat portion projecting upwardly out of said main body portion, and means for securing said pivoted section to its vertical position, substantially as specified.

Signed at the city of New York, in the county and State of New York, this 30th day of January, one thousand nine hundred and eighteen.

BAZEL E. CARRM.

Witnesses:
RAYMOND DUNCAN,
WILLIAM P. JONES.